J. S. ROBINSON.
BICYCLE PUMP.
APPLICATION FILED JAN. 23, 1903.
903,780.
Patented Nov. 10, 1908.
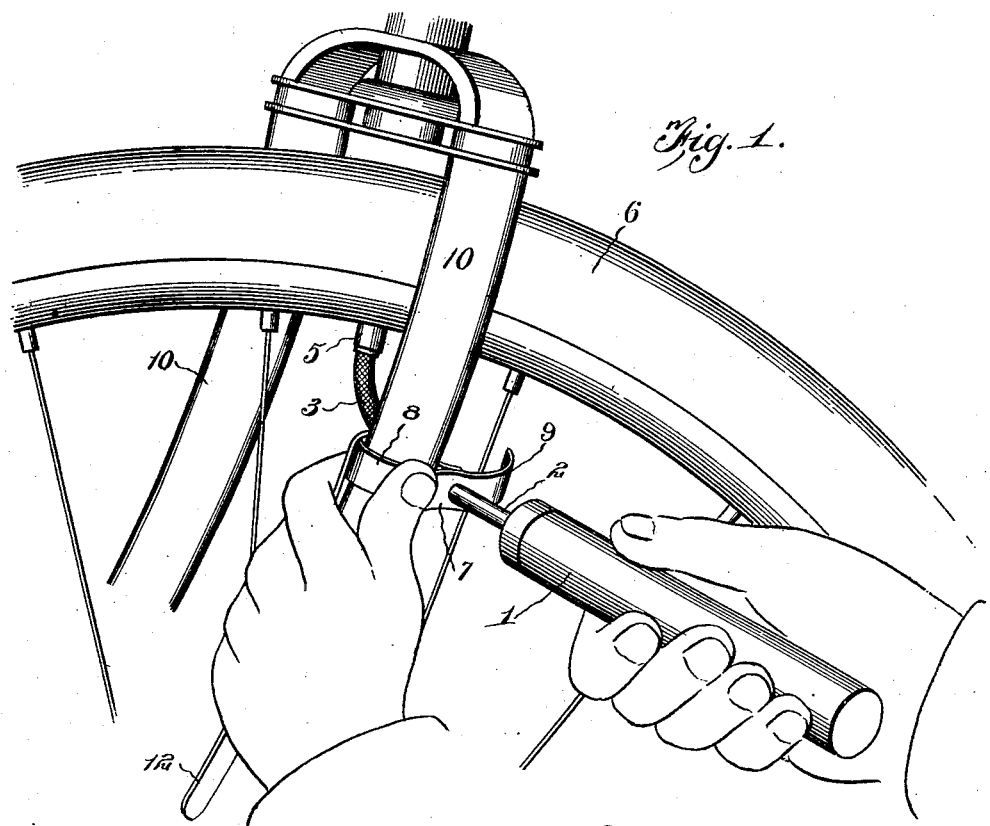
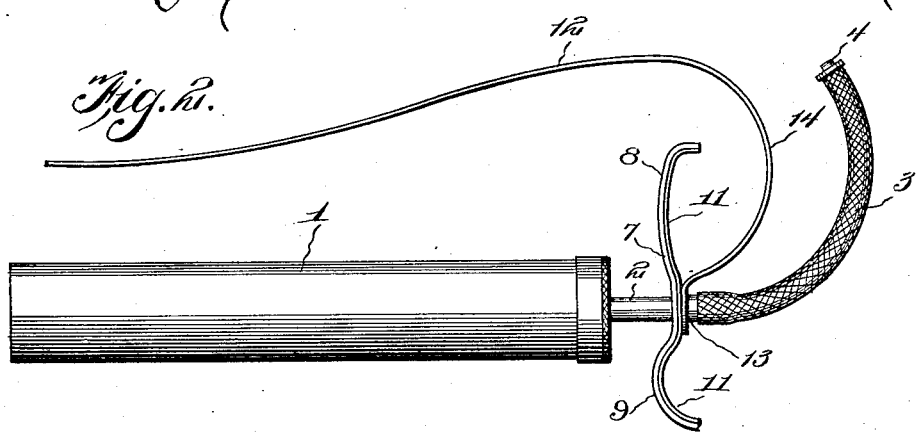
Witnesses
Louis R. Heinrichs
C. C. Hines
Inventor
Joseph S. Robinson
By Victor J. Evans
Attorney

UNITED STATES PATENT OFFICE.

JOSEPH S. ROBINSON, OF GAFFNEY, SOUTH CAROLINA.

BICYCLE-PUMP.

No. 903,780.　　　Specification of Letters Patent.　　　Patented Nov. 10, 1908.

Application filed January 23, 1908. Serial No. 412,298.

*To all whom it may concern:*

Be it known that I, JOSEPH S. ROBINSON, a citizen of the United States, residing at Gaffney, in the county of Cherokee and State of South Carolina, have invented new and useful Improvements in Bicycle-Pumps, of which the following is a specification.

This invention relates to improvements in bicycle pumps, and particularly to hand pumps of that type comprising a reciprocating barrel in which operates a piston provided with a tubular stem through which the air is discharged, said stem being ordinarily provided with a flexible tube adapted to couple the same to the valve casing of the tire.

The object of the invention is to provide a pump of this character having novel means by which the piston and piston stem may be clamped against movement in a simple and effective manner to a portion of the frame of the bicycle, thus enabling the stationary portion of the pump to be held firmly in position to afford convenience in the operation of the pump for inflating the tire.

A further object of the invention is to provide reversible clamping means adapting the pump to be secured to parts of a frame adjacent the front or rear wheel, and which will accommodate itself to the different shapes and sizes of such parts.

With these and other objects in view, the invention consists of the features of construction, combination and arrangement of parts hereinafter fully described, illustrated and claimed, reference being had to the accompanying drawing, in which:—

Figure 1 is a perspective view of a portion of the front wheel of a bicycle and the front fork of the frame, showing the mode of use of the invention. Fig. 2 is a view in side elevation of the pump with the clamping means applied thereto.

Referring to the drawing, the numeral 1 designates the reciprocating barrel of a bicycle hand pump of the character described, in which is arranged a piston (not shown), which is stationary in operation relatively to the barrel, and from which extends a tubular stem 2, to the outer end of which is connected one end of a hose tube 3 provided at its opposite end with a coupling fitting for connection with the valve 5 of the pneumatic tire 6. The air forced out by the pump when the barrel is reciprocated passes through the stem 2 and tube 3 and thence into the tire, as will be apparent to those versed in the art. In the ordinary construction of pump of this type, the outer end of the stem 2 is provided with a cross piece fixed thereto, which extends beyond opposite sides of the stem and is adapted to form a grip by which the stationary section of the pump may be held in one hand while the barrel 1 is engaged by and reciprocated through the motion of the other hand. It is well known that this construction is open to objections and disadvantages, because of the fact that it is impossible to hold the stationary portion of the pump steadily in the hand or simultaneously engage the grip and hold on to a portion of the frame in order to maintain the stationary portion firmly in a determined position while the barrel is being reciprocated.

In carrying my invention into practice, I provide upon the outer end of the stem 2 a cross piece or strip 7 having oppositely extending arms 8 and 9 of unequal length, the intermediate portion of said cross piece being fixed in any suitable manner to the stem. The arms 8 and 9 not only vary in length but in shape or curvature, to adapt them to respectively engage the outer surfaces of the front fork side 10 and a rear portion of the frame adjacent to the rear wheel, which portions of the frame vary similarly in size and contour.

The front or bearing surfaces of the arms 8 and 9 are provided with a lining 11 of cloth or other suitable soft flexible material which preferably extends as a facing along the entire front surface of the cross piece, thus adapting the arms 8 and 9, which serve the function of stationary clamping jaws, to be applied to the frame without injury to the latter.

A band or strip 12, of leather, flexible metal or any other suitable material, is connected at one end with the stem 2 in advance of the cross piece 7, as at 13, the strap being otherwise free from connection with the pump so that it may be drawn around part of the frame to which the pump is to be attached to clamp the same in position. The band or strap is fitted to turn at the point 13 upon the stem, so that it may be reversed for use in connection with either the jaw 8 or the jaw 9. It will be understood that the portion 14 of the band serves the function of a movable jaw adapted to coact with the jaw 8 or the jaw 9 to engage opposite surfaces of the frame part and thereby clamp the stem 2 against movement.

Fig. 1 shows the application of the pump for inflating the front tire 6 of a bicycle, from which it will be seen that the tube 3 is connected with the valve 5, the jaw 8 is brought to bear against the outer side of one of the fork arms 10, and the portion of the strip forming the movable jaw 14 engaged with the inner side of said arm. One hand of the operator may thus grasp the engaged fork arm 10, with the thumb of the hand resting against the jaw 8 and holding the same in position, while the free end of the band is drawn down between the hand and held by the pressure thereof against the arm, thus firmly fixing the stationary portion of the pump against movement, allowing the other hand to grasp and reciprocate the barrel 1 with increased convenience, as the piston and its stem will be securely held against movement.

In applying the pump or inflating the rear tire of the machine, the jaw 9 is brought to bear against one of the rear fork arms or one of the lower reach bars of the frame and the band reversed for coaction therewith, so that the pump may be clamped to such portion of the frame in a manner similar to that shown in Fig. 1, except that the frame part will be engaged by the band-jaw 14 and fixed jaw 9, as will be readily understood.

It will be seen from the foregoing description that the invention provides a simple form of means by which a pump of the character described may be held firmly in position during the operation of inflating a tire, and its advantages and conveniences will be manifest to those familiar with the inconveniences attending the use of hand pumps of ordinary construction.

Having thus fully described the invention, what is claimed as new is:—

1. A bicycle pump having a piston stem, a cross-piece connected with the stem and forming a stationary jaw, and a flexible clamping band connected at one end with the stem and adapted to be disposed to form a movable jaw for coöperation with said stationary jaw, with its free end arranged to be gripped with the stationary jaw and part of the frame of the bicycle in one of the hands of the operator to rigidly clamp the stem to said frame part.

2. A bicycle pump having a piston stem, a cross piece connected with the stem and having portions projecting beyond opposite sides thereof and forming stationary jaws varying in size and form to bear against different portions of the frame of a bicycle, and a flexible clamping band pivotally mounted upon the stem for coöperation with either of said clamping jaws and adapted to be disposed to form a movable jaw for coöperation with the acting stationary jaw and with its free end arranged to be gripped with the stationary jaw and frame part in one of the hands of the operator to rigidly clamp the stem to the frame.

In testimony whereof I affix my signature in presence of two witnesses.

JOSEPH S. ROBINSON.

Witnesses:
S. H. BRADFORD,
W. W. CROCKER.